United States Patent
Fang et al.

(10) Patent No.: US 11,719,550 B2
(45) Date of Patent: Aug. 8, 2023

(54) METHOD AND APPARATUS FOR BUILDING ROUTE TIME CONSUMPTION ESTIMATION MODEL, AND METHOD AND APPARATUS FOR ESTIMATING ROUTE TIME CONSUMPTION

(71) Applicant: Baidu Online Network Technology (Beijing) Co., Ltd., Beijing (CN)

(72) Inventors: Xiaomin Fang, Beijing (CN); Jizhou Huang, Beijing (CN); Fan Wang, Beijing (CN); Lingke Zeng, Beijing (CN); Haijin Liang, Beijing (CN); Haifeng Wang, Beijing (CN)

(73) Assignee: BAIDU ONLINE NETWORK TEGHNOLOGY (BEIIING) CO., LTD., Beijing (CN)

( * ) Notice: Subject to any disclaimer, the term of this patent is extended or adjusted under 35 U.S.C. 154(b) by 361 days.

(21) Appl. No.: 17/033,211

(22) Filed: Sep. 25, 2020

(65) Prior Publication Data
US 2021/0239483 A1    Aug. 5, 2021

(30) Foreign Application Priority Data
Feb. 3, 2020    (CN) .......................... 202010079202.5

(51) Int. Cl.
*G01C 21/34* (2006.01)
*G01C 21/36* (2006.01)
(Continued)

(52) U.S. Cl.
CPC ..... *G01C 21/3492* (2013.01); *G01C 21/3626* (2013.01); *G06F 18/214* (2023.01); *G06N 3/08* (2013.01)

(58) Field of Classification Search
None
See application file for complete search history.

(56) References Cited

U.S. PATENT DOCUMENTS

| 2018/0259345 A1 | 9/2018 | Wang et al. |
| 2019/0195628 A1 | 6/2019 | Lam et al. |

(Continued)

FOREIGN PATENT DOCUMENTS

| CN | 102110365 A | 6/2011 |
| CN | 106502985 A | 3/2017 |

(Continued)

OTHER PUBLICATIONS

A Spatial-Temporal Hybrid Model for Short-Term Traffic Prediction (Year: 2018).*

(Continued)

*Primary Examiner* — Christian Chace
*Assistant Examiner* — Shayne M. Gilbertson
(74) *Attorney, Agent, or Firm* — Ladas & Parry, LLP

(57) ABSTRACT

A method and apparatus for building a route time consumption estimation model, and a method and apparatus for estimating a route time consumption are provided. The method comprises: obtaining training data from user trajectory data; obtaining the route time consumption estimation model by using the training data, wherein the route time consumption estimation model comprises: a road condition subnetwork estimating road condition feature representations of road segments included by the route by using the time information and road network feature representations of road segments included by the route; an integration subnetwork determining an estimated time consumption on the route according to a feature representation of the time information, vector representations of the road segments included by the route and road condition feature representations of the road segments included by the route; a training target of the route time consumption estimation model is to minimize a difference between the estimated time consumption and an actual time consumption on the route. The (Continued)

accuracy of the estimation of time consumption on the route can be improved.

16 Claims, 5 Drawing Sheets

(51) Int. Cl.
  *G06N 3/08* (2023.01)
  *G06F 18/214* (2023.01)

(56) References Cited

U.S. PATENT DOCUMENTS

| 2019/0226855 A1* | 7/2019 | Fu | G01C 21/3407 |
| 2022/0146272 A1* | 5/2022 | Verma | G01C 21/3446 |

FOREIGN PATENT DOCUMENTS

| CN | 107305742 A | | 10/2017 |
| CN | 109670277 A | | 4/2019 |
| CN | 109754605 A | | 5/2019 |
| CN | 110163405 A | | 8/2019 |
| CN | 110400015 A | | 11/2019 |
| CN | 110470314 A | * | 11/2019 |
| CN | 110470314 A | | 11/2019 |
| CN | 110717627 A | | 1/2020 |
| WO | 2020019901 A1 | | 1/2020 |

OTHER PUBLICATIONS

Vision-based vehicle detection and counting system using deep learning in highway scenes (Year: 2019).*
Notice to Register and Supplementary Search Report from CN app. No. 202010079202.5, dated Aug. 5, 2021, with machine English translation from Global Dossier.
Cheng et al., "A Real-Time Traffic Prediction Method Using Floating Taxi Global Positioning System Data on Spark", Journal of Integration Technology, vol. 5, No. 6, Nov. 2016.
Zheng et al., "Short-term Traffic Forecasting Based on Support Vector Regression and an Analysis on a Real Regional Experiment in Beijing", Mathematics in Practice and Theory, vol. 40, No. 10, May 2010.
First Office Action and Search Report from CN app. No. 202010079202.5, dated Mar. 24, 2021, with English translation from Global Dossier.
First Office Action and Search Report from CN app. No. 202010079207.8, dated Dec. 3, 2020, with machine English translation from Google Translate.
Second Office Action and Supplementary Search Report from CN app. No. 202010079207.8, dated May 8, 2021, with English translation from Global Dossier.

* cited by examiner

METHOD AND APPARATUS FOR BUILDING ROUTE TIME CONSUMPTION ESTIMATION MODEL, AND METHOD AND APPARATUS FOR ESTIMATING ROUTE TIME CONSUMPTION

The present application claims the priority of Chinese Patent Application No. 202010079202.5, filed on Feb. 3, 2020, with the title of "Method and apparatus for building route time consumption estimation model, and method and apparatus for estimating route time consumption". The disclosure of the above application is incorporated herein by reference in its entirety.

FIELD OF THE DISCLOSURE

The present disclosure relates to technical field of computer application, particularly to the technical field of artificial intelligence.

BACKGROUND OF THE DISCLOSURE

In map services, a route time consumption estimation model is a very important model for estimating the time that needs to be taken to pass through the route. Route time consumption estimation may be used to return time consumption on the route to a user as a reference, and may also be used in other scenarios such as assisting in generating an optimal route.

Road condition features of road segments on the route will be used in conventional route time consumption estimation. The road condition features are usually obtained by an independent model, and the road conditions output by the model are used to train the route time consumption estimation model. That is to say, the model for obtaining road conditions and the route time consumption estimation model are trained separately so that it is difficult to capture an intrinsic linkage relationship between the road conditions and the time consumed on the route, thereby resulting in insufficient accuracy in estimating the time consumed on the route.

SUMMARY OF THE DISCLOSURE

In view of the above, the present disclosure provides a method and apparatus for building a route time consumption estimation model, and a method and apparatus for estimating a route time consumption, to facilitate improving the accuracy of route time consumption estimation.

In a first aspect, the present disclosure provides a method for building a route time consumption estimation model, the method comprising:

obtaining training data from user trajectory data, the training data comprising: a route through which a user passes, time information when the user passes through the route, and actual time consumption information for the user to pass through the route;

obtaining the route time consumption estimation model by using the training data, wherein the route time consumption estimation model comprises: a road condition subnetwork and an integration subnetwork;

the road condition subnetwork estimating road condition feature representations of road segments included by the route by using the time information and road network feature representations of road segments included by the route;

the integration subnetwork determining an estimated time consumption on the route according to a feature representation of the time information, vector representations of the road segments included by the route and road condition feature representations of the road segments included by the route;

a training target of the route time consumption estimation model being to minimize a difference between the estimated time consumption and an actual time consumption on the route.

According to a preferred embodiment of the present disclosure, the route time consumption estimation model further comprises a time subnetwork and/or a road segment subnetwork;

the time subnetwork being used to obtain the feature representation of the time information;

the road segment subnetwork being used to obtain the vector representations of the road segments included by the route.

According to a preferred embodiment of the present disclosure, the obtaining the vector representations of the road segments included by the route comprises:

obtaining the road segments included by the route and contexts of the road segments;

performing encoding with respect to each road segment and the context of the road segment by using a neural network to obtain the vector representation of the road segment.

According to a preferred embodiment of the present disclosure, the estimating the road condition feature representations of the road segments by using the time information comprises:

obtaining road condition features of the road segment at time points in a preset historical time length before the time information;

concatenating road network features of the road segment, the road condition features at time points in the preset historical time length before the time information and features of the time points in the historical time length, to obtain a spatiotemporal tensor corresponding to the road segment;

mapping the spatiotemporal tensor using an attention mechanism to obtain the road condition feature representation for estimating the road segment.

According to a preferred embodiment of the present disclosure, the obtaining road condition features of the road segment at time points in a preset historical time length before the time information comprises:

obtaining, from road condition diagrams at time points in the preset historical time length before the time information, road condition sub-diagrams corresponding to the road segment and its context;

encoding the road condition sub-diagrams to obtain road condition features of the road segment at the time points in the preset historical time length before the time information.

According to a preferred embodiment of the present disclosure, in the concatenating, performing random masking on partial road condition features at time points in the preset historical time length.

According to a preferred embodiment of the present disclosure, the determining the estimated time consumption on the route comprises:

the integration subnetwork integrating according to the feature representation of time information, vector representations of road segments included by the route and road condition feature representations of road segments included by the route, and then respectively obtaining estimated time consumptions on the road segments through mapping of a fully-connected layer;

obtaining the estimated time consumption on the route according to the estimated time consumptions on the road segments.

According to a preferred embodiment of the present disclosure, the minimizing a difference between the estimated time consumption and an actual time consumption on the route comprises:

determining a loss function according to the difference between the estimated time consumption on the route and the actual time consumption on the route, and performing feed-forward according to the loss function to update parameters of the route time consumption estimation model; or determining a loss function according to a difference between estimated time consumptions on road segments on the route and actual time consumptions on the road segments, and performing feed-forward according to the loss function to update parameters of the route time consumption estimation model; or determining a loss function according to the difference between the estimated time consumptions on road segments on the route and the actual time consumptions on the road segments, and the difference between the estimated time consumption on the route and the actual time consumption on the route, and performing feed-forward according to the loss function to update parameters of the route time consumption estimation model.

In a second aspect, the present disclosure provides a method for estimating a route time consumption, the method comprising:

obtaining a route to be estimated and time information for estimation;

inputting the route and the time information into a route time consumption estimation model to obtain an estimated time consumption on the route output by the route time consumption estimation model;

wherein the route time consumption estimation model is pre-built by the above method.

In a third aspect, the present disclosure provides an apparatus for building a route time consumption estimation model, the apparatus comprising:

a first obtaining unit configured to obtain training data from user trajectory data, the training data comprising: a route through which a user passes, time information when the user passes through the route, and actual time consumption information for the user to pass through the route;

a model training unit configured to obtain the route time consumption estimation model by using the training data, wherein the route time consumption estimation model comprises: a road condition subnetwork and an integration subnetwork;

the road condition subnetwork estimating road condition feature representations of road segments included by the route by using the time information and road network feature representations of road segments included by the route;

the integration subnetwork determining an estimated time consumption on the route according to a feature representation of the time information, vector representations of the road segments included by the route and road condition feature representations of the road segments included by the route;

a training target of the route time consumption estimation model being to minimize a difference between the estimated time consumption and an actual time consumption on the route.

According to a preferred embodiment of the present disclosure, the route time consumption estimation model further comprises a time subnetwork and/or a road segment subnetwork;

the time subnetwork being used to obtain the feature representation of the time information;

the road segment subnetwork being used to obtain the vector representations of the road segments included by the route.

According to a preferred embodiment of the present disclosure, the road segment subnetwork is specifically configured to obtain the road segments included by the route and contexts of the road segments; perform encoding with respect to each road segment and the context of the road segment by using a neural network to obtain the vector representation of the road segment.

According to a preferred embodiment of the present disclosure, the road condition subnetwork is specifically configured to obtain road condition features of the road segment at time points in a preset historical time length before the time information; concatenate road network features of the road segment, the road condition features at time points in the preset historical time length before the time information and features of the time points in the historical time length, to obtain a spatiotemporal tensor corresponding to the road segment; map the spatiotemporal tensor using an attention mechanism to obtain the road condition feature representation for estimating the road segment.

According to a preferred embodiment of the present disclosure, the road condition subnetwork, upon obtaining road condition features of the road segment at time points in a preset historical time length before the time information, specifically performs:

obtaining, from road condition diagrams at time points in the preset historical time length before the time information, road condition sub-diagrams corresponding to the road segment and the context of the road segment;

encoding the road condition sub-diagrams to obtain road condition features of the road segment at the time points in the preset historical time length before the time information.

According to a preferred embodiment of the present disclosure, the road condition subnetwork is further configured to, in the concatenating, perform random masking on partial road condition features at time points in the preset historical time length.

According to a preferred embodiment of the present disclosure, the integration subnetwork is specifically used to integrate according to the feature representation of time information, vector representations of road segments included by the route and road condition feature representations of road segments included by the route, and then respectively obtains estimated time consumptions on the road segments through mapping of a fully-connected layer; obtain the estimated time consumption on the route according to the estimated time consumptions on the road segments.

According to a preferred embodiment of the present disclosure, the model training unit is specifically used to:

determine a loss function according to a difference between the estimated time consumption on the route and the actual time consumption on the route, and perform feed-forward according to the loss function to update parameters of the route time consumption estimation model; or determine a loss function according to a difference between estimated time consumptions on road segments on the route and actual time consumptions on the road segments, and perform feed-forward according to the loss function to update parameters of the route time consumption estimation model; or determine a loss function according to the difference between the estimated time consumptions on road segments on the route and the actual time consumptions on the road segments, and the difference between the estimated time consumption on the route and the actual time consumption on the route, and perform feed-forward according to the loss function to update parameters of the route time consumption estimation model.

In a fourth aspect, the present disclosure provides an apparatus for estimating route time consumption, the apparatus comprising:

a second obtaining unit configured to obtain a route to be estimated and time information for estimation;

a time consumption estimation unit configured to input the route and the time information into a route time consumption estimation model to obtain an estimated time consumption on the route output by the route time consumption estimation model;

wherein the route time consumption estimation model is pre-built by the above apparatus.

In a fifth aspect, the present disclosure further provides an electronic device, comprising:

at least one processor; and a memory communicatively connected with the at least one processor; wherein, the memory stores instructions executable by the at least one processor, and the instructions are executed by the at least one processor to enable the at least one processor to perform the above-mentioned methods.

In a sixth aspect, the present disclosure further provides a non-transitory computer-readable storage medium storing computer instructions therein, wherein the computer instructions are used to cause the computer to perform the above-mentioned methods.

As can be seen from the above technical solutions, in the present disclosure, the prediction of road condition features of road segments included by the route is regarded as the training of integrating the subnetwork of the route time consumption estimation model into the route time consumption estimation model, thereby capturing an intrinsic linkage relationship between road conditions and the time consumption on the route, and improving the accuracy of the route time consumption estimation.

Other effects of the above optional modes will be described hereunder in conjunction with specific embodiments.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, which include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

Figure 1:
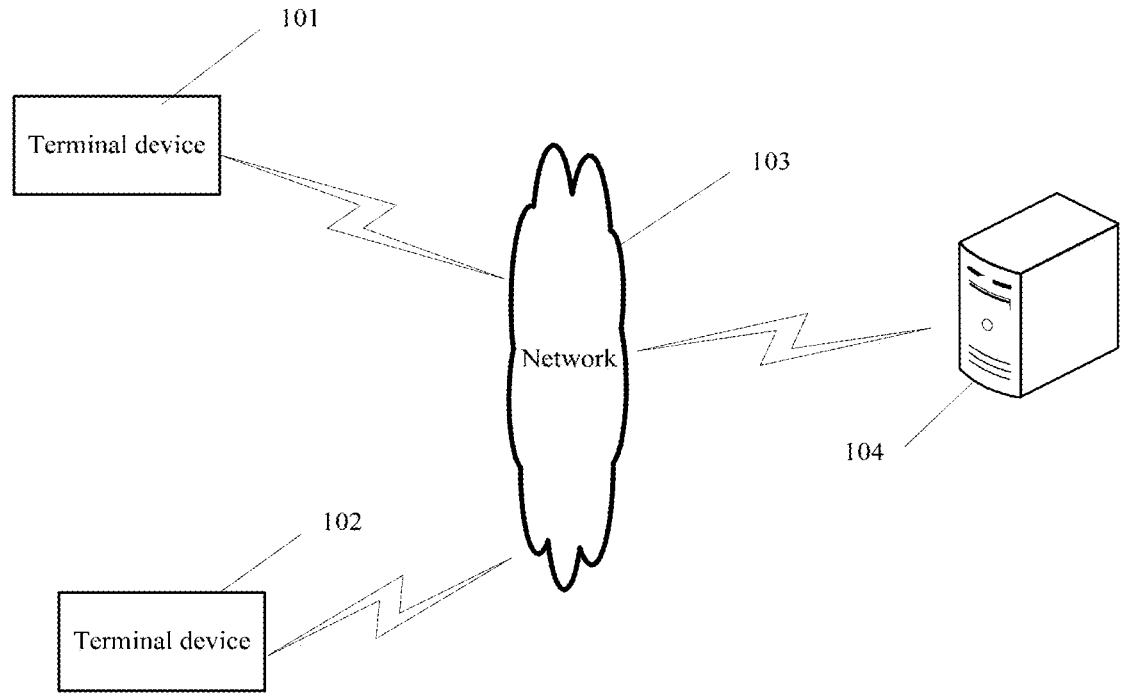
FIG. 1 illustrates a diagram of an exemplary system architecture to which embodiments of the present disclosure may be applied.

FIG. 1 illustrates an exemplary system architecture to which embodiments of the present disclosure may be applied. As shown in FIG. 1, the system architecture may include terminal devices 101 and 102, a network 103 and a server 104. The network 103 is used to provide a medium for a communication link between the terminal devices 101, 102 and the server 104. The network 103 may include various connection types, such as wired connection, wireless communication link, or fiber optic cable, etc.

The user may interact with the server 104 via the network 103 by using the terminal devices 101 and 102. Various applications may be installed on the terminal devices 101 and 102, for example a map-like application, a speech interaction application, a web browser application, a communication-like application, and so on.

The terminal devices 101 and 102 may be various electronic devices that can support and display a map-like application, and include but not limited to smart phones, tablet computers, smart wearable devices etc. The apparatus provided by the present disclosure may be disposed on and run on the above server 104. It may be implemented as a plurality of software or software modules (for example, to provide distributed service) or as a single software or software module, which is not specifically limited herein.

For example, an apparatus for building the route time consumption estimation module is disposed on and runs on the server 104. The server 104 may pre-collect and maintain user trajectory data uploaded by the terminal devices (including 101 and 102) during use of the map-like application. And the apparatus for building the route time consumption estimation module builds the route time consumption estimation model in a manner provided by embodiments of the present disclosure. When the user of the terminal device 101 or 102 needs to estimate time consumed on a certain route during use of the map-like application, an apparatus for estimating time consumed on the route disposed on and running on the server 104 estimates the time consumed on the route. The estimation result may return to the terminal device 101 or 102, or may be used for determining an optimal route, and return the determination result of the optimal route to the terminal device 101 or 102.

The server 104 may be a single server or a server group composed of a plurality of servers. It should be understood that the numbers of terminal devices, networks, and servers in FIG. 1 are only illustrative. According to the needs in implementation, there may be any number of terminal devices, networks and servers.

A core idea of the present disclosure lies in integrating a portion for road condition estimation into the route time consumption estimation model for joint training, thereby sufficiently considering the linkage relationship between the road conditions of road segments in the route and the route time consumption estimation, and improving the accuracy in estimating the time consumed on the route. The method according to the present disclosure will be described in detail in conjunction with embodiments. The method according to the present disclosure mainly comprises two phases: one is for building the route time consumption estimation model for estimating the time consumed on the route, and the other is for estimating the time consumed on the route by using the route time consumption estimation model. The two phases will be described in conjunction with Embodiment 1 and Embodiment 2.

Embodiment 1

Figure 2:
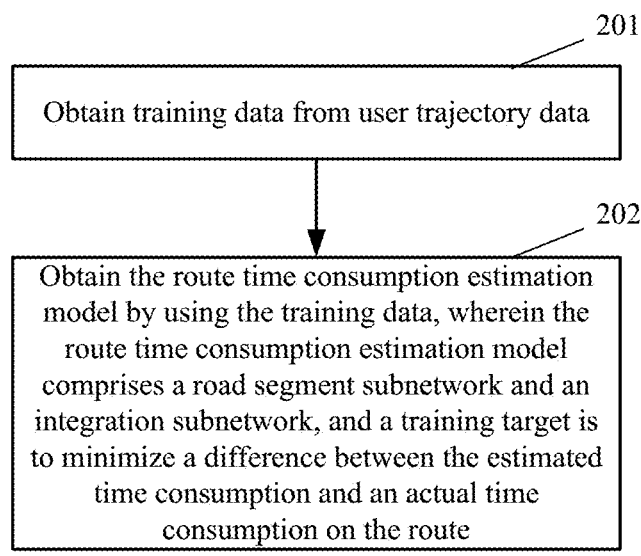
FIG. 2 illustrates a flow chart of a method of building a route time consumption estimation model according to Embodiment 1 of the present disclosure.

FIG. 2 illustrates a flow chart of a method of building a route time consumption estimation model according to Embodiment 1 of the present disclosure. As shown in FIG. 2, the method may comprise the following steps:

At 201, training data are obtained from user trajectory data.

The user will accumulate a lot of user trajectory data while using a map-like application. For example, the user will obtain navigation trajectory data while using navigation; when using a positioning function, the user will obtain time and position information of a lot of positioning points; etc. These data reflect the user's trajectory and include some relevant information of some users passing through some routes. The training data may include: a route through which the user passes, time information when the user passes through the route, and actual time consumption information when the user passes through the route.

It needs to be appreciated that the route time consumption estimation model built in the embodiments of the present disclosure may be built with respect to different travel manners, respectively And correspondingly, when the training data are obtained, they are obtained from the user trajectory data of the corresponding travel manners. For example, if the route time consumption estimation module corresponding to a car-driving manner is built, the training data are obtained from navigation trajectory data of the user's driving.

In an implementation mode, the training data may be obtained from the user's navigation trajectory data. For example, a piece of training data may include: the user's navigation route, the user's navigation time, and actual time consumption information when the user passes through the route, wherein the actual time consumption information of the route may include actual time consumption when the user passes through the entire route, or may also include actual time consumptions when the user passes through road segments included by the route.

In the embodiment of the present application, the route comprises at least one road segment which is usually a road between two intersections. A road segment does not include other intersections in the middle in addition to two ends.

At 202, the route time consumption estimation model is obtained by using the training data, the route time consumption estimation model includes a road condition subnetwork and an integration subnetwork, and a training target is to minimize a difference between the estimated time consumption and actual time consumption on the route.

To facilitate subsequent description, it is assumed the abovementioned piece of training data is represented as (L, $T_{nag}$, $T_L$), where L represents the user's navigation route, $T_{nag}$ represents the navigation time, and $T_L$ may be, in addition to the actual time consumption information of the route, a set composed of actual time consumptions of road segments included in L, namely, $\{T_{l1}, \ldots, T_{li}, \ldots, T_{lm}\}$, where the subscript li represents the $i^{th}$ road segment included by L, and m is the total number of road segments included by L.

Figure 3:
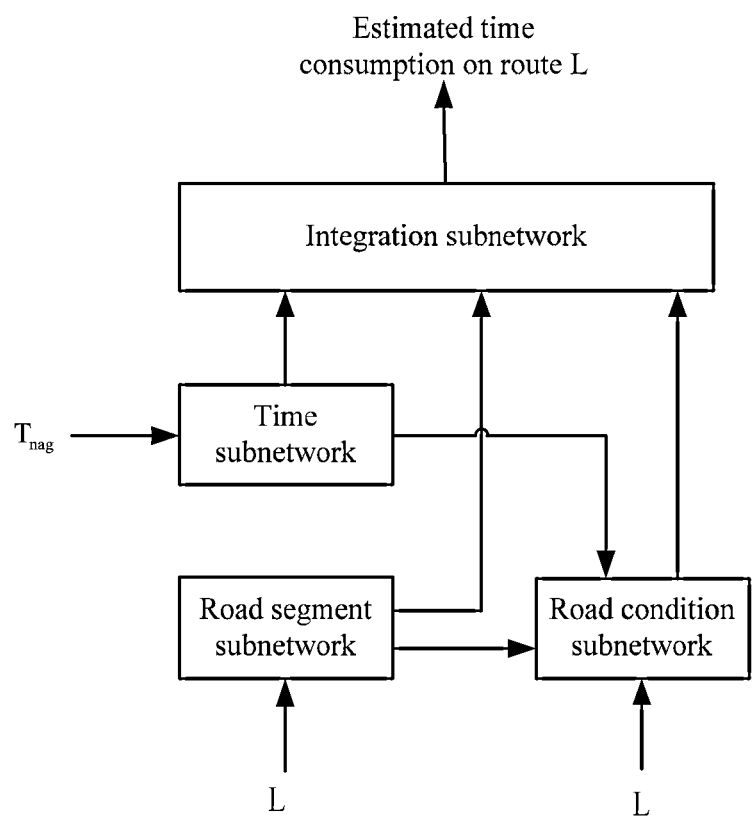
FIG. 3 illustrates a structural schematic diagram of a route time consumption estimation model according to Embodiment 1 of the present disclosure.

The route time consumption estimation model employed by the present disclosure may be structured as shown in FIG. 3, which at least includes a road condition subnetwork and an integration subnetwork, and may further include a time subnetwork and a road segment subnetwork.

The time subnetwork is used to obtain a feature representation of time information $T_{nag}$, where the time information $T_{nag}$ may be any one of information such as instant, week, month and holiday or any combinations thereof. In the present disclosure, the time information $T_{nag}$ may be encoded using for example a convolutional neural network to obtain the feature representation of time information $T_{nag}$, and the feature representation usually takes the form of a vector.

The road segment subnetwork is used to obtain vector representations of road segments included by the route L. The vector representations of the road segments may be vector representations of the road segments themselves, or vector representations of the road segments and their contexts themselves. The latter is preferred in the present disclosure. The road segments and their context are used to estimate the time consumption of the route. The vector representation of the route is a vector representation obtained by mapping the road segment (or the road segment and its context) into a road space, e.g., mapping at least one of an ID, name, position etc. of the road segment into the road space, to obtain its vector representation in the road space. The vector representation of the road segment represents and can solely represent a road segment.

Usually a route consists of more than one road segment. When the route includes a plurality of road segments, it is composed of the segments and intersections alternatingly, and each intersection might connect one or more segments. A context window may be employed in the present disclosure. When the context of a certain road segment represented as li is determined, the road segment li is made located in the context window, and other segments included in the window all are the context of li. The size of the window may employ an experimental value or an empirical value. That is to say, the context of the road segment includes: M road segments preceding the road segment and N road segments following the road segment on the route, where M and N are preset natural numbers. In addition, it is discovered after in-depth research that information such as road conditions of N road segments following the road segment li exerts a larger impact on the time consumption on the road segment li. Hence, a value of N is preferably set to be larger than that of M.

When the road segment subnetwork obtains the vector representation of road segments included by the route, the road segments included by the route and the context of the road segments may be first obtained; then encoding is performed with respect to each road segment and the context of the road segment by using for example a neural network such as a convolutional neural network or a recurrent neural network to obtain the vector representation of the road segment. The vector representation reflects a vector representation of the road segment and its context in a road space, and to a certain degree reflects information such as a connectional relationship and structure of the road segment and its context in the route.

The road condition subnetwork is used to estimate road condition feature representations of road segments included by the route L according to the time information $T_{nag}$ and road network feature representations of road segments included by the route L. That is to say, the road condition subnetwork functions to estimate the road condition information.

Future road conditions of each road segment are usually associated with its historical road conditions. Hence, the road condition subnetwork may obtain road condition features of the road segment at time points within a preset historical time length before the abovementioned $T_{nag}$; concatenate the road network feature of the road segment, the road condition features at time points within the preset historical time length before the $T_{nag}$ and features of respective time points within the historical time length to respectively obtain a spatiotemporal tensor corresponding to the road segment; and use an attention mechanism to map the spatiotemporal tensor to obtain the road condition feature representation for estimating the road segment.

However, future road conditions of each road segment are further associated with historical road condition information of its neighboring road segments, in addition to being associated with its own historical road conditions. Hence, as a preferred implementation mode, the road network features of the road segment employed by the road condition subnetwork consists of road network features of the road segment and its context. The road condition features are road condition features of the road segment and its context at time points within the preset historical time length before $T_{nag}$.

Figure 4:
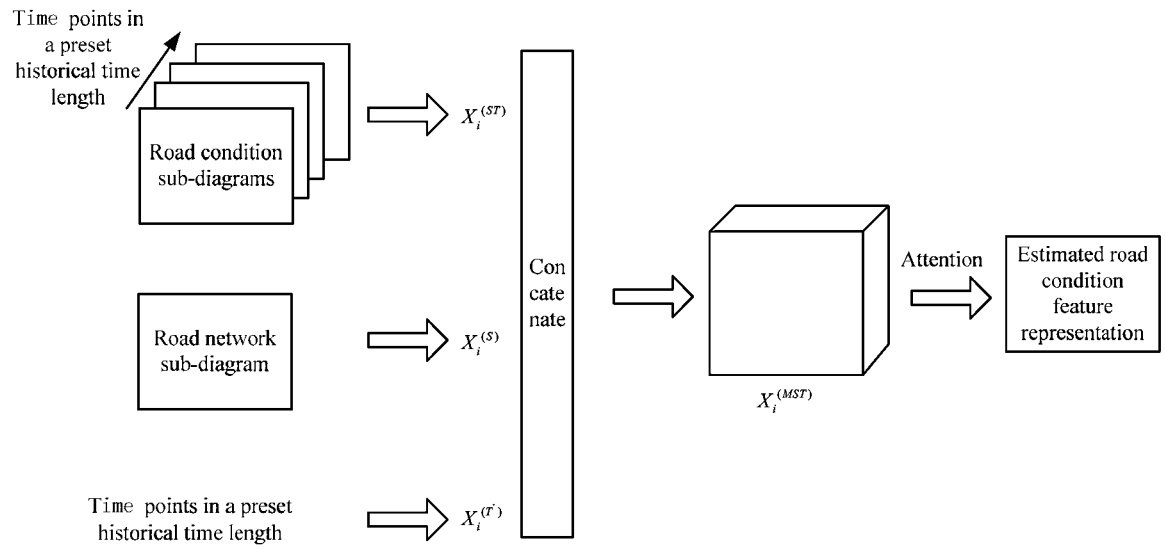
FIG. 4 illustrates a schematic diagram of a road condition subnetwork performing road condition estimation according to Embodiment 1 of the present disclosure.

In the embodiment, when estimating the road conditions of the road segment, the road condition subnetwork employs a new time-space diagram network modeling manner. As shown in FIG. 4, assuming there are n time points $\{t_1, \ldots, t_j, \ldots, t_n\}$ in the preset historical time length before $T_{nag}$, there is a road condition diagram corresponding to each time point. The road condition diagram may be obtained from a road condition database. The specific manner of generating and obtaining the road condition diagram is not limited in the present disclosure. The diagram structure of the road condition diagram depends on the road network. There is a road condition sub-diagram corresponding to each road segment li and its context in $t_j$, and then there are road condition sub-diagrams respectively corresponding to n time points in the preset historical time length before $T_{nag}$. The n road condition sub-diagrams, after being encoded, constitute a road condition feature matrix $X_i^{(ST)}$ within the preset historical time length of the road segment.

As for the road segment a time feature $X_i^{(T)}$, a road network feature $X_i^{(S)}$ and $X_i^{(ST)}$ at the time points in the historical time length are concatenated to constitute a 3D tensor $X_i^{(MST)}$, then an attention mechanism is used to map the tensor $X_i^{(MST)}$ as a road condition feature representation estimating the road segment li. The road condition feature representation is usually denoted with a vector. The 3D tensor $X_i^{(MST)}$ serves as a key in the attention mechanism, and the road condition feature representation obtained from the mapping serves as a value. When online road segment time consumption estimation is performed, the feature representation of time information and the road network feature representation of the road segment are concatenated as a query. A hit value is obtained by calculating a similarity between the query and the key. It needs to be appreciated that before concatenating to obtain the tensor, the method may further comprise performing processing such as unification for the dimensions of the feature representations. No details will be presented herein.

The following equations may be employed in using the attention mechanism:

$$Q_i = \text{Act}\left(W^{(Q)} g\text{Concat}\left(x_{i,w}^{(CL)}, x_i^{(T)}\right) + b^{(Q)}\right) \quad (1)$$

$$K_{i,j,k} = \text{Act}\left(W^{(K)} g X_{i,j,k}^{MST} + b^{(K)}\right) \quad (2)$$

$$V_{i,j,k} = \text{Act}\left(W^{(V)} g X_{i,j,k}^{MST} + b^{(V)}\right) \quad (3)$$

$$f(Q_i, K_{i,j,k}) = \frac{Q_i^T g K_{i,j,k}}{\sqrt{d^{(ATT)}}} \quad (4)$$

$$\alpha(Q_i, K_{i,j,k}) = \frac{\exp(f(Q_i, K_{i,j,k}))}{\sum_{j',k'} \exp(f(Q_i, K_{i,j',k'}))} \quad (5)$$

$$\text{Attention}(Q_i, K_i, V_i) = \sum_{j,k} \alpha(Q_i, K_{i,j,k}) V_{i,j,k} \quad (6)$$

where the subscript i represents the $i^{th}$ road segment on the route, the subscript j represents the $j^{th}$ time point in the historical time length, and the subscript k represents a space dimension of the $i^{th}$ road segment in the road network and can be understood as the number of neighboring road segments. Q, K and V represent the query, the key and the value, respectively. The Act( ) function involved in Equations (1)-(3) is an activation function, and Contact( ) involved in Equation (1) is used to concatenate contents in the parentheses. Equation (4) relates to computing a degree of association between $Q_i$ and $K_{i,j,k}$ and $d^{(ATT)}$ is the dimension of the query and the key. Equation (5) relates to normalizing the computed degree of association. Equation (6) relates to performing weighting summation on the values by using the normalized degree of association as weight. $W^{(Q)}$, $b^{(Q)}$, $W^{(K)}$, $b^{(K)}$, $W^{(V)}$ and $b^{(V)}$ appearing in the above equations are all model parameters.

When the route time consumption estimation is performed online, some historical road condition information might lose due to problems such as network transmission. Hence, to address such actually-existing problem, when the above tensors are concatenated during model training, a random masking may be performed on partial road condition features at time points in the preset historical time length, e.g., partial road condition features are covered and replaced with a zero vector. This manner can effectively ease and adapt to the impact caused by road condition information loss or noise during the route time consumption estimation, and improve the stability of the model.

The integration subnetwork is responsible for integrating information of the above three subnetworks to estimate time consumption on the route. That is, the integration subnetwork is used to determine an estimated time consumption on the route L according to the above feature representation of time information $T_{nag}$, vector representations of road segments included by the route L and road condition feature representations of road segments included by the route L corresponding to the time information.

As one of implementation modes, the integration subnetwork may concatenate the above feature representation of time information $T_{nag}$, vector representations of road segments included by the route L and road condition feature representations of road segments included by the route L, and then directly map the concatenation to the estimated time consumption on the route L through a fully-connected layer.

In this case, a loss function may be determined according to a difference between the estimated time consumption on the route L and actual time consumption $T_L$ on the route L, and feed-forward is performed according to the loss function to update parameters of the route time consumption estimation model. The parameters of the route time consumption estimation model include parameters of four subnetworks.

Figure 5:
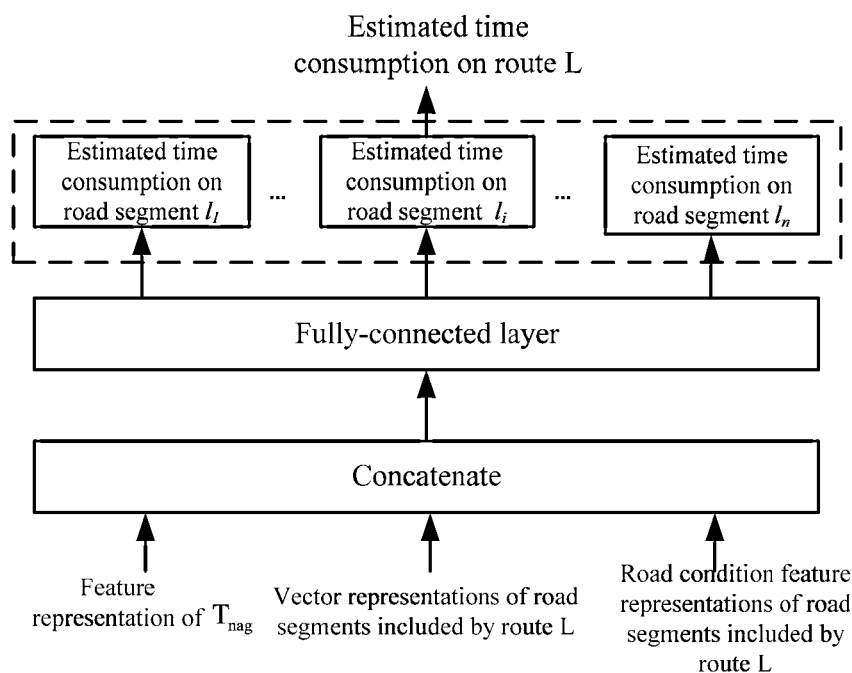
FIG. 5 illustrates a structural schematic diagram of an integration subnetwork according to Embodiment 1 of the present disclosure.

As another implementation mode, as shown in FIG. 5, the integration network may concatenate the above feature representation of time information $T_{nag}$, vector representations of road segments included by the route L and road condition feature representations of road segments included by the route L respectively according to the road segments, then map the concatenation to estimated time consumptions on the road segments through a fully-connected layer, and then integrate (e.g., summate) the estimated time consumptions on the road segments to obtain the estimated time consumption on the route L.

In this implementation mode, a loss function may be determined according to a difference between the estimated time consumptions of road segments on the route L and actual time consumption on the road segments, and feed-forward is performed according to the loss function to update parameters of the route time consumption estimation model.

A total loss function may be determined according to the difference between the estimated time consumptions of road segments on the route L and actual time consumptions on the road segments, and the difference between the estimated time consumption on the route L and actual time consumption on the route, and feed-forward is performed according to the loss function to update parameters of the route time consumption estimation model.

No matter which loss function is employed, its target is to minimize the difference between the overall estimated time consumption and the actual time consumption on the route L.

The structure of the route time consumption estimation model shown in the above embodiment is a preferred implementation mode, but structures in other forms may also be employed. For example, the route time consumption estimation model may only include the above road condition subnetwork or integration subnetwork, whereas the time subnetwork and the road segment subnetwork may respectively serve as an independent model which are additionally trained independent from the route time consumption estimation model, or the time subnetwork and road segment subnetwork may also employ a feature extraction manner already existing in the prior art.

After the route time consumption estimation model is obtained by pre-training in the manner stated in the above Embodiment 1, the model may be used to perform online route time consumption estimation. The present disclosure will be described below through Embodiment 2.

Embodiment 2

Figure 6:
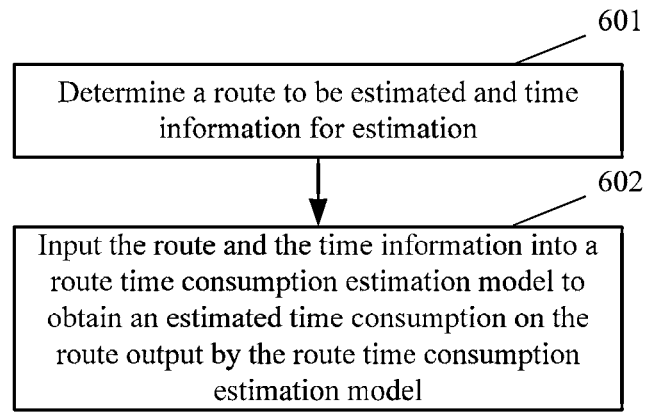
FIG. 6 illustrates a flow chart of a method of estimating route time consumption according to Embodiment 2 of the present disclosure.

FIG. 6 illustrates a flow chart of a method of estimating route time consumption according to Embodiment 2 of the present disclosure. As shown in FIG. 6, the method may comprise the following steps:

At 601, a route to be estimated and time information for estimation are determined.

When time consumption estimation needs to be performed for a route, the route is regarded as the route to be estimated. For example, when the user wants to query for a route from a starting point to a destination, at least one route from the starting point to the destination may be respectively regarded as the route to be estimated, and the current query time may be regarded as the time information for estimation. Again for example, the user selects a route from recommended routes for navigation, the route may be regarded as the route to be estimated, and the current navigation time may be regarded as the time information for estimation. All application scenarios are not exhausted herein.

At 602, the route and the time information are input into the route time consumption estimation model to obtain an estimated time consumption on the route output by the route time consumption estimation model.

It is assumed that the route is represented as $L_{cur}$, the time information is represented as $T_{cur}$. Then, in the estimation model, $T_{cur}$ is input into a time subnetwork. The time subnetwork obtains a feature representation of $T_{cur}$, for example, obtains the feature representation of $T_{cur}$ by encoding the $T_{cur}$ with for example a convolutional neural network.

$L_{cur}$ is input into a road segment subnetwork. The road segment subnetwork obtains feature identifications of road segments included by $L_{cur}$. As a preferred implementation mode, the road and the context of the road segment may be respectively obtained with respect to road segments included by $L_{cur}$, and a vector representation of the road segment may be obtained after encoding the road segment and its context by using for example a convolutional neural network, a recurrent neural network or the like. The vector representation reflects, to a certain degree, information such as the connectional relationship and structure of the road segment and its context in the route.

The context of the road segment includes: M road segments preceding the road segment and N road segments following the road segment on the route, where M and N are preset natural numbers.

The output of the road segment subnetwork and the time subnetwork is taken as input of the road condition subnetwork. The road condition subnetwork estimates road condition feature representations of road segments included by the route $L_{cur}$ according to the feature representation of the time $T_{cur}$ and road network feature representations of road segments included by $L_{cur}$.

Specifically, the road condition subnetwork may obtain road condition features of the road segment at time points in a preset historical time length before the above $T_{cur}$; concatenate the road network feature of the road segment, the road condition features at time points in the preset historical time length before the above $T_{cur}$ and features of the time points in the historical time length, to respectively obtain a spatiotemporal tensor corresponding to the road segment; use an attention mechanism to map the spatiotemporal tensor to obtain the road condition feature representation for estimating the road segment.

The above spatiotemporal tensor may be taken as a query. A value corresponding to a key with the highest degree of association is found by computing the degree of association with keys. The value is the road condition feature representation for estimating the road segment obtained by mapping. Reference may be made to the depictions of Embodiment 1 for specific equations, which will not be detailed any more here.

Then, the output of the time subnetwork, the road segment subnetwork and road condition subnetwork is all taken as the input of the integration subnetwork. The integration subnetwork determines the estimated time consumption on the route according to the feature representation of $T_{cur}$, vector representations of road segments included by the route $L_{cur}$ and road condition feature representations of road segments included by the route $L_{cur}$ corresponding to the time information.

As one of implementation modes, the integration subnetwork may concatenate the feature representation of $T_{cur}$, vector representations of road segments included by the route $L_{cur}$ and road condition feature representations of road segments included by the route $L_{cur}$ corresponding to the time information, and then directly map the concatenation to the estimated time consumption on the route $L_{cur}$ through a fully-connected layer.

As another implementation mode, corresponding to the structure as shown in FIG. 5, the integration network may concatenate the feature representation of $T_{cur}$, vector representations of road segments included by the route $L_{cur}$ and road condition feature representations of road segments included by the route $L_{cur}$ corresponding to the time information, then map the concatenation to estimated time consumptions on the road segments through a fully-connected layer, and then integrate (e.g., summate) the estimated time consumptions on the road segments to obtain the estimated time consumption on the route $L_{cur}$.

Under different application scenarios, when the estimated time consumption of the route is obtained, different subsequent processing may be performed. For example, when the user wants to query for a route from a starting point to a destination, time consumptions are estimated for candidate routes respectively, and an optimal route is recommended to the user. Again for example, the user selects a route for navigation, the estimated time consumption on the route may be returned to the user for reference by the user.

The above describes the methods according to embodiments of the present disclosure in detail. Apparatuses according to embodiments of the present disclosure will be described in detail in conjunction with the embodiments.

Embodiment 3

Figure 7:
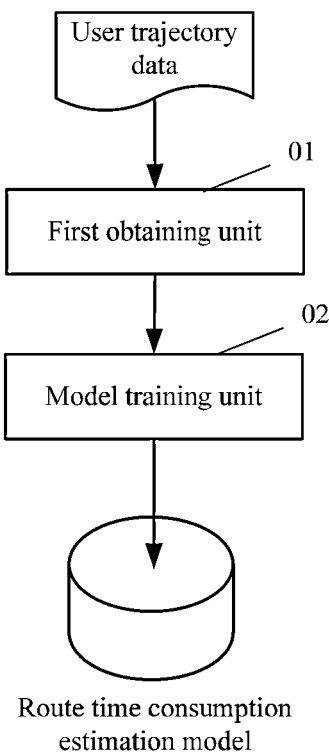
FIG. 7 illustrates a block diagram of an apparatus for building a route time consumption estimation model according to Embodiment 3 of the present disclosure.

FIG. 7 illustrates a block diagram of an apparatus for building a route time consumption estimation model according to Embodiment 3 of the present disclosure. As shown in FIG. 7, the apparatus may include: a first obtaining unit 01 and a model training unit 02. Main functions of the units are as follows:

The first obtaining unit 01 is configured to obtain training data from user trajectory data. The training data includes: a route through which the user passes, time information when the user passes through the route, and actual time consumption information when the user passes through the route.

In an implementation, the training data may be obtained from the user's navigation trajectory data. For example, a piece of training data may include: the user's navigation route, the user's navigation time, and actual time consumption information when the user passes through the route, wherein the actual time consumption information of the route may include actual time consumption when the user passes through the entire route, or may also include actual time consumptions when the user passes through road segments included by the route.

The model training unit 02 is configured to obtain the route time consumption estimation model by using the training data, wherein the route time consumption estimation model includes a road condition subnetwork and an integration subnetwork, and may further include: a time subnetwork and/or a road segment subnetwork.

The road condition subnetwork is used to estimate road condition feature representations of road segments included by the route by using the time information and road network feature representations of road segments included by the route.

The integration subnetwork is used to determine an estimated time consumption on the route according to the feature representation of time information, vector representations of road segments included by the route and road condition feature representations of road segments included by the route.

A training target of the route time consumption estimation model is to minimize a difference between the estimated time consumption and actual time consumption on the route.

The time subnetwork is used to obtain the feature representation of the time information.

The road segment subnetwork is used to obtain the vector representations of the road segments included by the route.

Specifically, the road segment subnetwork may obtain road segments included by the route and the context of the road segments; and use a neural network to encode with respect to each road segment and the context of the road segment, to obtain the vector representation of the road segment.

The road condition subnetwork may obtain road condition features of the road segment at time points in a preset historical time length before the time information; concatenate the road network feature of the road segment, the road condition features at time points in the preset historical time length before the time information and features of the time points in the historical time length, to obtain a spatiotemporal tensor corresponding to the road segment; and use an attention mechanism to map the spatiotemporal tensor to obtain the road condition feature representation for estimating the road segment.

Specifically, when road condition subnetwork obtains road condition features of the road segment at time points in a preset historical time length before the time information, it may obtain, from road condition diagrams at time points in the preset historical time length before the time information, road condition sub-diagrams corresponding to the road segment and the context of the road segment; encode the road condition sub-diagrams to obtain road condition features of the road segment at the time points in the preset historical time length before the time information.

To effectively ease and adapt to the impact caused by road condition information loss or noise during the route time consumption estimation, and improve the stability of the model, the road condition subnetwork is further used to perform random masking on partial road condition features at time points in the preset historical time length, i.e., cover partial road condition features and replace them with zero vector.

The integration subnetwork is specifically used to integrate the feature representation of time information, vector representations of road segments included by the route and road condition feature representations of road segments included by the route, and then respectively obtain estimated time consumptions on the road segments through the mapping of the fully-connected layer; and obtain the estimated time consumption on the route according to the estimated time consumptions on the road segments.

There is another manner. The integration subnetwork is specifically used to integrate the feature representation of time information, vector representations of road segments included by the route and road condition feature representations of road segments included by the route, and then obtain estimated time consumption of the route through the mapping of the fully-connected layer.

The model training unit 02 may employ the following manners in performing feed-forward in each route of iteration to update the model parameters:

Manner 1: determine a loss function according to a difference between the estimated time consumption on the route and the actual time consumption on the route, and perform feed-forward according to the loss function to update parameters of the route time consumption estimation model.

Manner 2: determine a loss function according to a difference between estimated time consumptions on road segments on the route and actual time consumptions on the road segments, and perform feed-forward according to the loss function to update parameters of the route time consumption estimation model.

Manner 3: determine a loss function according to the difference between the estimated time consumptions on road segments on the route and actual time consumptions on the road segments, and the difference between the estimated time consumption on the route and actual time consumption on the route, and perform feed-forward according to the loss function to update parameters of the route time consumption estimation model.

Embodiment 4

Figure 8:
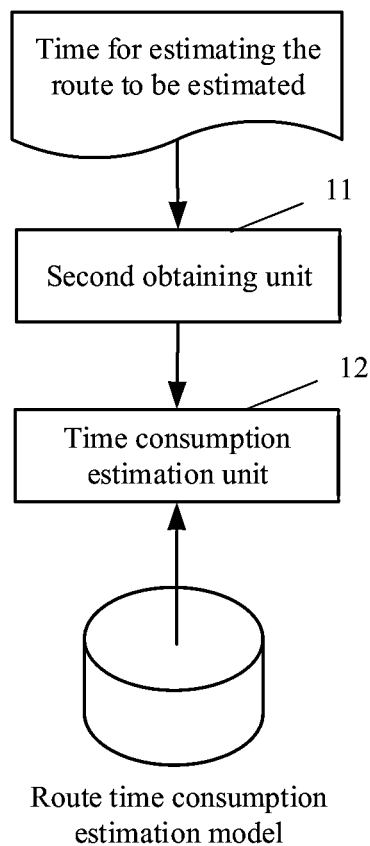
FIG. 8 illustrates a block diagram of an apparatus for estimating a route time consumption according to an embodiment of the present disclosure.

FIG. 8 illustrates a block diagram of an apparatus for estimating route time consumption according to an embodiment of the present disclosure. As shown in FIG. 8, the apparatus may comprise: a second obtaining unit 11 and a time consumption estimation unit 12. Main functions of the units are as follows:

The second obtaining unit 11 is configured to obtain a route to be estimated and time information for estimation;

The time consumption estimation unit 12 is configured to input the route and the time information into a route time consumption estimation model to obtain an estimated time consumption on the route output by the route time consumption estimation model.

Reference may be made to detailed description in Embodiment 2 for the time consumption on the route as estimated by the time consumption estimation unit 12 using the route time consumption estimation model. Detailed description will not be presented here anymore.

According to embodiments of the present disclosure, the present disclosure further provides an electronic device and a readable storage medium.

Figure 9:
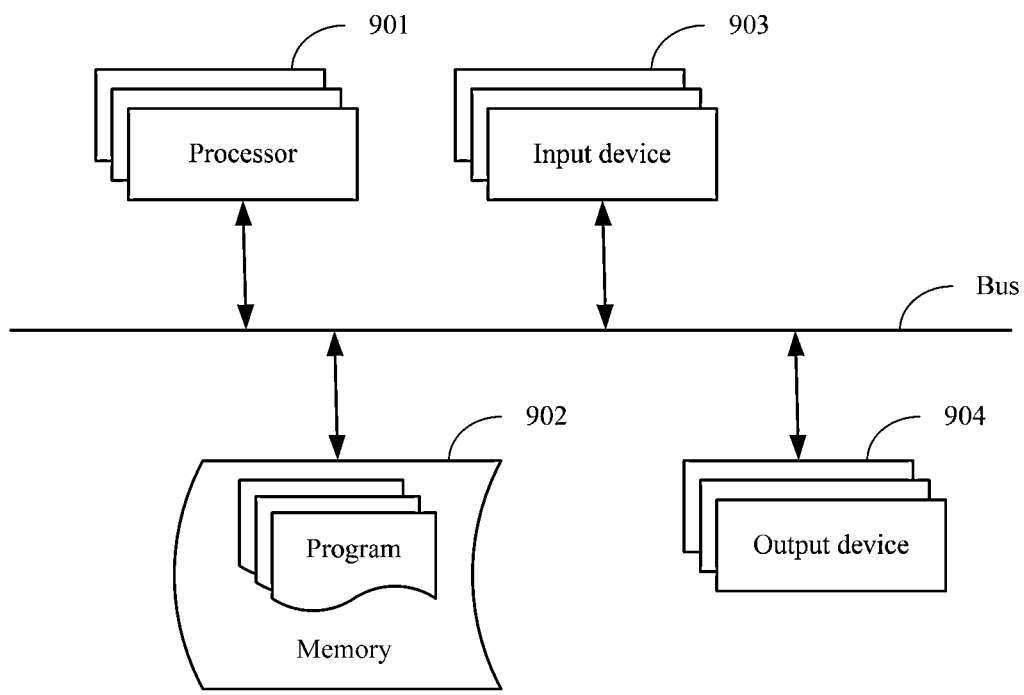
FIG. 9 illustrates a block diagram of an electronic device for implementing embodiments of the present disclosure.

As shown in FIG. 9, it shows a block diagram of an electronic device for building the route time consumption estimation model according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

As shown in FIG. 9, the electronic device comprises: one or more processors 901, a memory 902, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor 901 is taken as an example in FIG. 9.

The memory 902 is a non-transitory computer-readable storage medium provided by the present disclosure. Wherein, the memory stores instructions executable by at least one processor, so that the at least one processor executes the method for building the route time consumption estimation model or the method for estimating a time consumption on the route according to the present disclosure. The non-transitory computer-readable storage medium of the present disclosure stores computer instructions, which are used to cause a computer to execute the method for building the route time consumption estimation model or the method for estimating a time consumption on the route according to the present disclosure.

The memory 902 is a non-transitory computer-readable storage medium and can be used to store non-transitory software programs, non-transitory computer executable programs and modules, such as program instructions/modules corresponding to the method for building the route time consumption estimation model or the method for estimating a time consumption on the route according to the present disclosure. The processor 901 executes various functional applications and data processing of the server, i.e., implements the method for building the route time consumption estimation model or the method for estimating a time consumption on the route in the above method embodiments, by running the non-transitory software programs, instructions and modules stored in the memory 902.

The memory 902 may include a storage program region and a storage data region, wherein the storage program region may store an operating system and an application program needed by at least one function; the storage data region may store data created according to the use of the electronic device. In addition, the memory 902 may include a high-speed random access memory, and may also include a non-transitory memory, such as at least one magnetic disk storage device, a flash memory device, or other non-transitory solid-state storage device. In some embodiments, the memory 902 may optionally include a memory remotely arranged relative to the processor 901, and these remote memories may be connected to the electronic device for implementing the method of generating the speech packet according to embodiments of the present disclosure through a network. Examples of the above network include, but are not limited to, the Internet, an intranet, a local area network, a mobile communication network, and combinations thereof.

The electronic device for implementing the method of generating the speech packet may further include an input device 903 and an output device 904. The processor 901, the memory 902, the input device 903 and the output device 904 may be connected through a bus or in other manners. In FIG. 9, the connection through the bus is taken as an example.

The input device 903 may receive inputted numeric or character information and generate key signal inputs related to user settings and function control of the electronic device for implementing the method of generating the speech packet, and may be an input device such as a touch screen, keypad, mouse, trackpad, touchpad, pointing stick, one or more mouse buttons, trackball and joystick. The output device 904 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

As can be seen from the above depictions, the method, apparatus, device and computer storage medium according to the present disclosure may have the following advantages:

1) In the present disclosure, the prediction of road condition features of road segments included by the route is regarded as the subnetwork of the route time consumption estimation model and integrated into the training of the route time consumption estimation model, thereby capturing an intrinsic linkage relationship between road conditions and the time consumption on the route, and improving the accuracy of the route time consumption estimation.

2) In the present disclosure, road segments and their contexts are integrated into the process of the route time consumption estimation, i.e., the relationship between road segments is integrated, thereby improving the accuracy of the route time consumption estimation.

3) In the present disclosure, after the time consumption on each road segment is predicted, the time consumption on the whole route is determined with the time consumptions on the road segments. As compared with an end-to-end prediction manner (i.e., build a model by connecting all road segments in series to directly predict the time consumption on the route), the manner according to the present disclosure exhibits a shorter period of time for calculation and has more sufficient training data.

4) In the present disclosure, the diagram structure of the road network is used for road condition prediction, and a 3D spatiotemporal tensor is constructed for modeling, information about time (a plurality of historical time points) and space (road conditions of the route and its context, and the structural diagram of the road network) are taken as a whole for road condition prediction, thereby sufficiently capturing spatiotemporal information and further improving the accuracy of the route time consumption estimation.

5) In the present disclosure, random masking may be performed on partial road condition features at time points in the preset historical time length during model training, thereby effectively easing and adapting to the impact caused by road condition information loss or noise during the route time consumption estimation, and improving the stability of the model.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for building a route time consumption estimation model, wherein the method comprises:
   obtaining training data from user trajectory data, the training data comprising: a route through which a user passes, time information when the user passes through the route, and actual time consumption information for the user to pass through the route;
   obtaining the route time consumption estimation model by using the training data, wherein the route time consumption estimation model comprises: a road condition subnetwork and an integration subnetwork;
   the road condition subnetwork estimating road condition feature representations of road segments included by the route by using the time information and road network feature representations of road segments included by the route;
   the integration subnetwork determining an estimated time consumption on the route according to a feature representation of the time information, vector representations of the road segments included by the route and road condition feature representations of the road segments included by the route;
   a training target of the route time consumption estimation model being to minimize a difference between the estimated time consumption and an actual time consumption on the route,
   wherein a feed-forward is performed during the training according to a loss function corresponding to the training target to update parameters of the route time consumption estimation model, and the parameters of the route time consumption estimation model comprises parameters of the road condition subnetwork and the integration subnetwork,
   wherein the estimating the road condition feature representations of the road segments by using the time information comprises:
   obtaining road condition features of the road segment at time points in a preset historical time length before the time information;
   concatenating road network features of the road segment, the road condition features at time points in the preset historical time length before the time information and features of the time points in the historical time length, to obtain a spatiotemporal tensor corresponding to the road segment;
   mapping the spatiotemporal tensor using an attention mechanism to obtain the road condition feature representation for estimating the road segment,
   wherein in the concatenating, performing random masking on partial road condition features at time points in the preset historical time length to cover partial road condition features and replace the covered road condition features with a zero vector.

2. The method according to claim 1, wherein the route time consumption estimation model further comprises: a time subnetwork and/or a road segment subnetwork;
   the time subnetwork being used to obtain the feature representation of the time information;
   the road segment subnetwork being used to obtain the vector representations of the road segments included by the route.

3. The method according to claim 2, wherein the obtaining the vector representations of the road segments included by the route comprises:
   obtaining the road segments included by the route and contexts of the road segments;
   performing encoding with respect to each road segment and the context of the road segment by using a neural network to obtain the vector representation of the road segment.

4. The method according to claim 1, wherein the obtaining road condition features of the road segment at time points in a preset historical time length before the time information comprises:
   obtaining, from road condition diagrams at time points in the preset historical time length before the time information, road condition sub-diagrams corresponding to the road segment and its context;
   encoding the road condition sub-diagrams to obtain road condition features of the road segment at the time points in the preset historical time length before the time information.

5. The method according to claim 1, wherein the determining the estimated time consumption on the route comprises:
   the integration subnetwork integrating according to the feature representation of time information, vector representations of road segments included by the route and road condition feature representations of road segments included by the route, and then respectively obtaining estimated time consumptions on the road segments through mapping of a fully-connected layer;
   obtaining the estimated time consumption on the route according to the estimated time consumptions on the road segments.

6. The method according to claim 5, wherein the minimizing a difference between the estimated time consumption and an actual time consumption on the route comprises:
   determining the loss function according to the difference between the estimated time consumption on the route and the actual time consumption on the route, and performing feed-forward according to the loss function to update parameters of the route time consumption estimation model; or
   determining the loss function according to a difference between estimated time consumptions on road segments on the route and actual time consumptions on the road segments, and performing feed-forward according to the loss function to update parameters of the route time consumption estimation model; or
   determining the loss function according to the difference between the estimated time consumptions on road segments on the route and the actual time consumptions on the road segments, and the difference between the estimated time consumption on the route and the actual time consumption on the route, and performing feed-forward according to the loss function to update parameters of the route time consumption estimation model.

7. A method for estimating a route time consumption, wherein the method comprises:
   obtaining a route to be estimated and time information for estimation;
   inputting the route and the time information into a route time consumption estimation model to obtain an estimated time consumption on the route output by the route time consumption estimation model;

wherein the route time consumption estimation model is pre-built by the method according to claim 1.

8. An electronic device, comprising at least one processor; and a memory communicatively connected with the at least one processor;

wherein the memory stores instructions executable by the at least one processor, and the instructions are executed by the at least one processor to enable the at least one processor to perform a method for building a route time consumption estimation model, wherein the method comprises:

obtaining training data from user trajectory data, the training data comprising: a route through which a user passes, time information when the user passes through the route, and actual time consumption information for the user to pass through the route;

obtaining the route time consumption estimation model by using the training data, wherein the route time consumption estimation model comprises: a road condition subnetwork and an integration subnetwork;

the road condition subnetwork estimating road condition feature representations of road segments included by the route by using the time information and road network feature representations of road segments included by the route;

the integration subnetwork determining an estimated time consumption on the route according to a feature representation of the time information, vector representations of the road segments included by the route and road condition feature representations of the road segments included by the route;

a training target of the route time consumption estimation model being to minimize a difference between the estimated time consumption and an actual time consumption on the route, wherein a feed-forward is performed during the training according to a loss function corresponding to the training target to update parameters of the route time consumption estimation model, and the parameters of the route time consumption estimation model comprises parameters of the road condition subnetwork and the integration subnetwork, wherein the estimating the road condition feature representations of the road segments by using the time information comprises:

obtaining road condition features of the road segment at time points in a preset historical time length before the time information;

concatenating road network features of the road segment, the road condition features at time points in the preset historical time length before the time information and features of the time points in the historical time length, to obtain a spatiotemporal tensor corresponding to the road segment;

mapping the spatiotemporal tensor using an attention mechanism to obtain the road condition feature representation for estimating the road segment, wherein in the concatenating, performing random masking on partial road condition features at time points in the preset historical time length to cover partial road condition features and replace the covered road condition features with a zero vector.

9. The electronic device according to claim 8, wherein the route time consumption estimation model further comprises a time subnetwork and/or a road segment subnetwork;

the time subnetwork being used to obtain the feature representation of the time information;

the road segment subnetwork being used to obtain the vector representations of the road segments included by the route.

10. The electronic device according to claim 9, wherein the obtaining the vector representations of the road segments included by the route comprises:

obtaining the road segments included by the route and contexts of the road segments;

performing encoding with respect to each road segment and the context of the road segment by using a neural network to obtain the vector representation of the road segment.

11. The electronic device according to claim 8, wherein the obtaining road condition features of the road segment at time points in a preset historical time length before the time information comprises:

obtaining, from road condition diagrams at time points in the preset historical time length before the time information, road condition sub-diagrams corresponding to the road segment and its context;

encoding the road condition sub-diagrams to obtain road condition features of the road segment at the time points in the preset historical time length before the time information.

12. The electronic device according to claim 8, wherein the determining the estimated time consumption on the route comprises:

the integration subnetwork integrating according to the feature representation of time information, vector representations of road segments included by the route and road condition feature representations of road segments included by the route, and then respectively obtaining estimated time consumptions on the road segments through mapping of a fully-connected layer;

obtaining the estimated time consumption on the route according to the estimated time consumptions on the road segments.

13. The electronic device according to claim 12, wherein the minimizing a difference between the estimated time consumption and an actual time consumption on the route comprises:

determining the loss function according to the difference between the estimated time consumption on the route and the actual time consumption on the route, and performing feed-forward according to the loss function to update parameters of the route time consumption estimation model; or determining the loss function according to a difference between estimated time consumptions on road segments on the route and actual time consumptions on the road segments, and performing feed-forward according to the loss function to update parameters of the route time consumption estimation model; or determining the loss function according to the difference between the estimated time consumptions on road segments on the route and the actual time consumptions on the road segments, and the difference between the estimated time consumption on the route and the actual time consumption on the route, and performing feed-forward according to the loss function to update parameters of the route time consumption estimation model.

14. An electronic device, comprising
at least one processor; and
a memory communicatively connected with the at least one processor;
wherein the memory stores instructions executable by the at least one processor, and the instructions are executed by the at least one processor to enable the at least one processor to perform a method for estimating a route time consumption, wherein the method comprises:
obtaining a route to be estimated and time information for estimation;
inputting the route and the time information into a route time consumption estimation model to obtain an estimated time consumption on the route output by the route time consumption estimation model;
wherein the route time consumption estimation model is pre-built by the method according to claim 1.

15. A non-transitory computer-readable storage medium storing computer instructions therein, wherein the computer instructions are used to cause the computer to perform a method for building a route time consumption estimation model, wherein the method comprises the following steps:
obtaining training data from user trajectory data, the training data comprising: a route through which a user passes, time information when the user passes through the route, and actual time consumption information for the user to pass through the route;
obtaining the route time consumption estimation model by using the training data, wherein the route time consumption estimation model comprises: a road condition subnetwork and an integration subnetwork;
the road condition subnetwork estimating road condition feature representations of road segments included by the route by using the time information and road network feature representations of road segments included by the route;
the integration subnetwork determining an estimated time consumption on the route according to a feature representation of the time information, vector representations of the road segments included by the route and road condition feature representations of the road segments included by the route;
a training target of the route time consumption estimation model being to minimize a difference between the estimated time consumption and an actual time consumption on the route,
wherein a feed-forward is performed during the training according to a loss function corresponding to the training target to update parameters of the route time consumption estimation model, and the parameters of the route time consumption estimation model comprises parameters of the road condition subnetwork and the integration subnetwork,
wherein the estimating the road condition feature representations of the road segments by using the time information comprises:
obtaining road condition features of the road segment at time points in a preset historical time length before the time information;
concatenating road network features of the road segment, the road condition features at time points in the preset historical time length before the time information and features of the time points in the historical time length, to obtain a spatiotemporal tensor corresponding to the road segment;
mapping the spatiotemporal tensor using an attention mechanism to obtain the road condition feature representation for estimating the road segment,
wherein in the concatenating, performing random masking on partial road condition features at time points in the preset historical time length to cover partial road condition features and replace the covered road condition features with a zero vector.

16. A non-transitory computer-readable storage medium storing computer instructions therein, wherein the computer instructions are used to cause the computer to perform a method for building a method for estimating a route time consumption, wherein the method comprises the following steps:
obtaining a route to be estimated and time information for estimation;
inputting the route and the time information into a route time consumption estimation model to obtain an estimated time consumption on the route output by the route time consumption estimation model;
wherein the route time consumption estimation model is pre-built by the method according to claim 1.

* * * * *